United States Patent
Kim et al.

(10) Patent No.: US 11,144,644 B2
(45) Date of Patent: Oct. 12, 2021

(54) UPDATE MANAGEMENT APPARATUS OF INDUSTRY CONTROL SYSTEM, APPARATUS AND METHOD FOR UPDATE VERIFICATION

(71) Applicant: ELECTRONICS AND TELECOMMUNICATIONS RESEARCH INSTITUTE, Daejeon (KR)

(72) Inventors: Tae-Yeon Kim, Daejeon (KR); Chan-Woo Bae, Daejeon (KR); Hee-Min Kim, Daejeon (KR); Hyeong-Min Seo, Daejeon (KR); Jung-Hwa Han, Daejeon (KR); Sung-Il Lee, Daejeon (KR); Eung-Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 340 days.

(21) Appl. No.: 15/791,786

(22) Filed: Oct. 24, 2017

(65) Prior Publication Data
US 2018/0121651 A1   May 3, 2018

(30) Foreign Application Priority Data

Oct. 28, 2016 (KR) .................. 10-2016-0141984

(51) Int. Cl.
*G06F 12/14* (2006.01)
*G06F 21/56* (2013.01)
(Continued)

(52) U.S. Cl.
CPC .............. *G06F 21/565* (2013.01); *G06F 8/65* (2013.01); *G06F 16/1873* (2019.01);
(Continued)

(58) Field of Classification Search
CPC ............. G06F 16/188; G06F 2201/815; G06F 2212/402; G06F 2221/2107; G06F 21/34;
(Continued)

(56) References Cited

U.S. PATENT DOCUMENTS

| 7,127,067 | B1 | 10/2006 | Wachtler et al. |
| 8,726,396 | B1 * | 5/2014 | Dodke ................ G06F 21/6209 726/26 |

(Continued)

FOREIGN PATENT DOCUMENTS

| KR | 10-2008-0037450 A | 4/2008 |
| KR | 10-2011-0041894 A | 4/2011 |

(Continued)

OTHER PUBLICATIONS

Konstantinou et al, Towards Self-Configuring Networks, May 30, 2002, IEEE, pp. 1-14. (Year: 2002).*

(Continued)

*Primary Examiner* — Luu T Pham
*Assistant Examiner* — Jenise E Jackson
(74) *Attorney, Agent, or Firm* — LRK Patent Law Firm (57) ABSTRACT

An update management apparatus and an update verification apparatus and method of a control system. The update verification apparatus of the control system includes a file type classification unit for classifying one or more input update files into any one file type of a firmware file, a patch file, and another type of file; an integrity verification unit for verifying integrity of the update files based on the file types of the update files; and an update file generation unit for generating a final update file from the update files, the integrity of which has been verified.

6 Claims, 8 Drawing Sheets

(51) Int. Cl.
  *G06F 16/23* (2019.01)
  *G06F 21/57* (2013.01)
  *G06F 16/18* (2019.01)
  *G06F 8/65* (2018.01)
(52) U.S. Cl.
  CPC ........ *G06F 16/2365* (2019.01); *G06F 21/572* (2013.01); *G06F 2221/033* (2013.01)
(58) Field of Classification Search
  CPC .......... G06F 21/44; G06F 21/50; G06F 21/64; G06F 21/565; G06F 21/572; G06F 21/561; G06F 16/1873; G06F 16/2365; G06F 8/65; G06F 2221/033; H04L 63/0227; H04L 63/12; H04L 9/3236; H04L 63/20
  USPC ............................................ 713/165; 726/23
  See application file for complete search history.

(56) References Cited

U.S. PATENT DOCUMENTS

| | | | | |
|---|---|---|---|---|
| 9,444,832 B1* | 9/2016 | Ladikov | .............. | H04L 63/1416 |
| 2003/0163702 A1* | 8/2003 | Vigue | ................. | H04L 63/0823 |
| | | | | 713/176 |
| 2005/0188366 A1* | 8/2005 | Chang | ..................... | G06F 8/654 |
| | | | | 717/168 |
| 2006/0075401 A1* | 4/2006 | Smegner | ................... | G06F 8/65 |
| | | | | 717/174 |
| 2007/0033586 A1* | 2/2007 | Hirsave | ................... | G06F 21/51 |
| | | | | 717/174 |
| 2007/0250595 A1* | 10/2007 | Landfield | ............ | H04L 63/1441 |
| | | | | 709/218 |
| 2008/0086513 A1* | 4/2008 | O'Brien | ................ | G06F 21/554 |
| 2010/0318983 A1* | 12/2010 | Hung | ...................... | G06F 8/654 |
| | | | | 717/168 |
| 2012/0304249 A1* | 11/2012 | Luo | ........................ | G06F 21/554 |
| | | | | 726/1 |
| 2013/0263104 A1* | 10/2013 | Baset | ...................... | G06F 8/658 |
| | | | | 717/168 |
| 2015/0205979 A1* | 7/2015 | Dong | ..................... | G06F 21/568 |
| | | | | 726/22 |
| 2017/0048354 A1* | 2/2017 | Meyer | ..................... | H04L 67/34 |
| 2017/0076094 A1* | 3/2017 | Bae | ......................... | G06F 21/56 |
| 2017/0085585 A1* | 3/2017 | Morkovsk | ........... | H04L 63/1425 |
| 2018/0343271 A1* | 11/2018 | Tenorio | ............... | H04L 63/1408 |
| 2019/0012460 A1* | 1/2019 | Hartnett | ................ | G06F 21/568 |
| 2019/0080089 A1* | 3/2019 | Chen | ..................... | G06F 21/564 |

FOREIGN PATENT DOCUMENTS

| | | |
|---|---|---|
| KR | 10-1052734 B1 | 7/2011 |
| KR | 10-1290818 B1 | 7/2013 |
| KR | 10-2013-0134790 A | 12/2013 |
| KR | 10-2015-0056244 A | 5/2015 |

OTHER PUBLICATIONS

Seo et al, Detection of Unknown Malicious Codes Based on Group File Characterisitcs, Dec. 18, 2010, IEE, pp. 1-6. (Year: 2010).*
Charles Higby et al., "Wireless Security Patch Management System," Section 3, Proceedings of the 5th conference on Information Technology Education, 2004.
Huseyin Cavusoglu et al., "Economics of Security Patch Management," Section 2, WEIS, 2006.

* cited by examiner

//UPDATE MANAGEMENT APPARATUS OF INDUSTRY CONTROL SYSTEM, APPARATUS AND METHOD FOR UPDATE VERIFICATION

CROSS REFERENCE TO RELATED APPLICATION

This application claims the benefit of Korean Patent Application No. 10-2016-0141984, filed Oct. 28, 2016, which is hereby incorporated by reference in its entirety into this application.

BACKGROUND OF THE INVENTION

1. Technical Field

The present invention relates to technology for securely installing a patch and an update for a field control device of a control system and managing a patch and update history.

2. Description of Related Art

A control system indicates a system in which a specific operation or process is monitored and controlled using a computer in order to acquire a target result or value. These days, control systems function to adjust the temperature and humidity in houses and buildings, to manage the quality of products in factories, and to perform automated flow production, and are being applied to various industrial fields, such as machine tool control, space technology and weapons systems, computer control, transportation systems, power systems, robots, and the like.

Unlike an IT system used in a general working environment, a control system is operated while being disconnected from an external network such as the Internet, and thus the control system is not capable of directly downloading a patch to be installed.

Generally, users may acquire patch files and vaccine update files by downloading them from the homepage of a vendor or by receiving them from a distribution server in an internal network to which a vendor has delivered the same. Also, a vendor may deliver patch files and vaccine update files by e-mail, or a maintenance worker of the vendor may deliver them using a portable storage device such as a CD or a USB storage device.

Therefore, a control system performs update by receiving patch files and vaccine update files through a storage device, such as a CD or a USB storage device, or through a distribution server.

Meanwhile, when a patch or an update is applied to a program installed in a control system, the control system may be infected with malicious code, or the patch or the update may cause a problem.

Therefore, it is necessary to develop technology for protecting a control system from malicious code when applying a patch or an update to a program installed therein and for managing a patch and update history in order to respond to a problem. In connection with this, Korean Patent No. 10-1052734 discloses a technology related to "Application patching apparatus and method."

SUMMARY OF THE INVENTION

An object of the present invention is to prevent the occurrence of a security problem by checking files related to patching and updating of a control system in advance.

Another object of the present invention is to generate a final update file using an update verification apparatus that is separate from a control system, and to thereby prevent an input update file from affecting the control system when the input update file is infected with malicious code.

A further object of the present invention is to enable response to a problem related to patching and updating based on a history of patching and updating of a control system.

Yet another object of the present invention is to automatically announce an update of a program installed in a control system and to provide information thereabout.

Still another object of the present invention is to automatically or manually collect and manage Reference Data Sets (RDSs) and to thereby generate a final update file using a firmware file, the integrity of which has been verified.

In order to accomplish the above objects, an apparatus for verifying an update of a control system according to the present invention includes a file type classification unit for classifying one or more update files, input in order to update a program corresponding to a control device of the control system, into any one file type of a firmware file, a patch file, and another type of file; an integrity verification unit for verifying integrity of the update files so as to correspond to file types of the update files; and an update file generation unit for generating a final update file from the update files, the integrity of which has been verified.

Here, the apparatus may further include a pretest performance unit for performing a pretest for the input update files.

Here, the pretest performance unit may perform the pretest that includes at least one of checking whether the update file is infected with malicious code and checking whether the update file violates a policy.

Here, the integrity verification unit may verify the integrity based on a Reference Data Set (RDS) when the update file is the firmware file.

Here, the integrity verification unit may verify the integrity based on a virus check tool when the update file is any one of the patch file and the other type of file.

Here, the update file generation unit may generate the final update file so as to be stored on a CD and provide the CD to a user.

Here, the apparatus may further include a communication unit for sending a result of classifying the update files to an update management apparatus and receiving information about whether the result of classifying the update files is approved or the file type of the update file, set by the update management apparatus, from the update management apparatus.

Here, the integrity verification unit may verify the integrity using the RDS, received from an update management apparatus in response to a request sent thereto.

Also, a method for verifying an update of a control system, performed by an apparatus for verifying an update of the control system according to an embodiment of the present invention, includes classifying one or more update files, input in order to update a program corresponding to a control device of the control system, into any one file type of a firmware file, a patch file, and another type of file; verifying integrity of the classified update files; and generating a final update file from the update files, the integrity of which has been verified.

Here, the method may further include performing a pretest for the input update files.

Here, performing the pretest may be configured to perform the pretest that includes at least one of checking whether the update file is infected with malicious code and checking whether the update file violates a policy.

Here, verifying the integrity may be configured to verify the integrity based on a Reference Data Set (RDS) when the update file is the firmware file.

Here, verifying the integrity may be configured to verify the integrity based on a virus check tool when the update file is any one of the patch file and the other type of file.

Here, generating the final update file may be configured to generate the final update file so as to be stored on a CD and to provide the CD to a user.

Here, the method may further include sending a result of classifying the update files to an update management apparatus; and receiving information about whether the result of classifying the update files is approved or the file type of the update file, set by the update management apparatus, from the update management apparatus.

Here, verifying the integrity may include requesting the RDS from an update management apparatus; receiving the RDS from the update management apparatus; and verifying the integrity using the received RDS.

Also, an apparatus for managing an update of a control system according to the present invention may include a file classification management unit for receiving a result of classification of an update file from an update verification apparatus of the control system and storing the result; an RDS management unit for collecting and storing a Reference Data Set (RDS) corresponding to the update file; and a patch history management unit for determining whether at least one of the update file and a program corresponding to a control device of the control system is a latest version and outputting an update notification message when it is determined that at least one of the program and the update file is not the latest version.

Here, the RDS management unit may include an automatic management module for acquiring the RDS corresponding to the update file through crawling based on a preset policy and storing the RDS; and a manual management module for updating the RDS depending on a result of comparison of a hash value of an update file found by a user with a hash value of the program corresponding to the control device.

Here, the patch history management unit may update at least one of the program and the update file by connecting to a URL corresponding to a latest version of at least one of the program and the update file.

Here, the file classification management unit may output the received result of classification of the update file to a user and receive information about whether the result of classification is approved or about reclassification of the update file from the user.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

Figure 1:
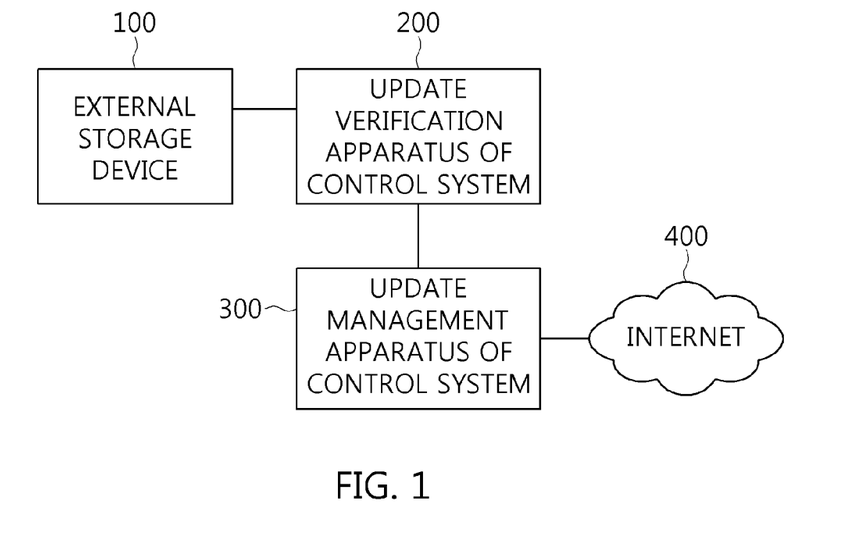
FIG. 1 is a view that schematically shows an environment to which an update verification apparatus and an update management apparatus of a control system according to an embodiment of the present invention are applied.

FIG. 1 is a view that schematically shows an environment to which an update verification apparatus and an update management apparatus of a control system according to an embodiment of the present invention are applied.

As illustrated in FIG. 1, an update management system of a control system includes an update verification apparatus 200 of the control system, which may be connected with an external storage device 100, and an update management apparatus 300 of the control system. Here, the update management apparatus 300 may be connected with the Internet 400, which is an external network.

First, the external storage device 100 stores one or more update files to be input to the update verification apparatus 200. Also, the external storage device 100 delivers the one or more update files stored therein to the update verification apparatus 200.

Here, the external storage device 100 may be a diskette, a disk, a CD, a memory card, a removable hard disk drive, a DVD, a USB memory device, or the like, and the type of the external storage device 100 is not limited to these examples.

Also, the update verification apparatus 200 receives one or more update files from the external storage device 100, verifies the one or more input update files, and generates a final update file.

The update verification apparatus 200 may store the final update file on a CD and provide the CD to a user. That is, using the update verification apparatus 200, a user who performs patching may verify the input update files and acquire the verified final update files as a CD.

Here, the update verification apparatus 200 may be implemented as a device that is separate from the control system in order to prevent the update file, input from the external storage device 100, from affecting the control system when the input update file is infected with malicious code. Also, the update verification apparatus 200 may be implemented in the form of a kiosk.

The update verification apparatus 200 classifies the one or more input update files according to file type into any one of a firmware file, a patch file and another type of file. Then, the update verification apparatus 200 sends the result of classification of the update files to the update management apparatus 300 and receives information about whether the result of classification is approved or a reclassified file type of the update files from the update management apparatus 300.

Then, the update verification apparatus 200 verifies the integrity of the update files depending on the file type thereof and generates a final update file from the update files, the integrity of which has been verified.

The update verification apparatus 200 may request and receive a Reference Data Set (RDS) from the update management apparatus 300, and may verify the integrity of the update files using the received RDS. Also, the update verification apparatus 200 may verify the integrity of the update files using a virus check tool.

Also, the update verification apparatus 200 may perform a pretest for the input update files. The update verification apparatus 200 may check whether the update file is infected with malicious code or whether the update file violates a preset policy.

Next, the update management apparatus 300 receives the result of classification of the update files from the update verification apparatus 200 and stores it. Then, the update management apparatus 300 may request a user to approve the result of classification and send information about the user's approval to the update verification apparatus 200.

Also, the update management apparatus 300 collects and stores an RDS corresponding to the update file. Here, the update management apparatus 300 may automatically store an RDS through crawling based on a preset policy, or may manually store an RDS found by an administrator.

When an RDS corresponding to a firmware file, which is the update file, is not released or is not acquired through crawling, the update management apparatus 300 may receive information for searching for the corresponding firmware file from an administrator. Then, the update management apparatus 300 downloads the found firmware file and compares the hash value of the downloaded firmware file with that of the firmware file corresponding to a control device of the control system.

When the result of the comparison indicates that the two hash values are equal to each other, the update management apparatus 300 receives the content of an update from an administrator based on patch information corresponding to the downloaded firmware file. Then, the update management apparatus 300 uploads the received content of the update to an RDS DB.

Hereinafter, the configuration of an update verification apparatus of a control system according to an embodiment of the present invention will be described in detail with reference to FIG. 2.

Figure 2:
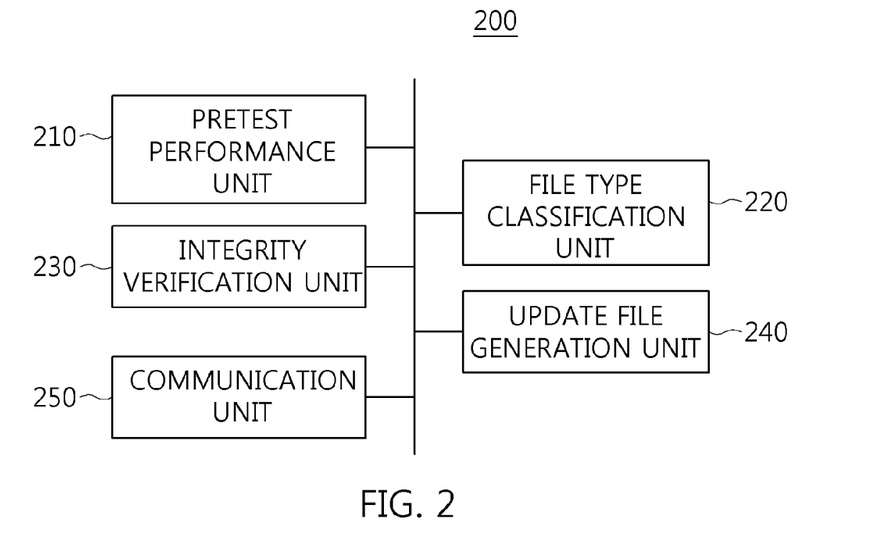
FIG. 2 is a block diagram that shows the configuration of an update verification apparatus of a control system according to an embodiment of the present invention.

FIG. 2 is a block diagram that shows the configuration of an update verification apparatus of a control system according to an embodiment of the present invention.

As illustrated in FIG. 2, the update verification apparatus 200 of the control system includes a pretest performance unit 210, a file type classification unit 220, an integrity verification unit 230, an update file generation unit 240, and a communication unit 250.

First, the pretest performance unit 210 performs a pretest for one or more input update files.

The pretest performance unit 210 may perform a pretest that includes at least one of checking whether the update file is infected with malicious code and checking whether the update file violates a policy.

The file type classification unit 220 classifies the update files depending on the file type thereof. Here, the file type classification unit 220 may classify the update files into any one of a firmware file, a patch file and another type of file.

Also, the file type classification unit 220 may send a result of classification of the update files to the update management apparatus 300 through the communication unit 250, and may store the result of classification of the update files in a file classification history management DB.

The integrity verification unit 230 verifies the integrity of the classified update files based on the file type thereof.

When the update file is a firmware file, the integrity verification unit 230 verifies the integrity thereof based on a Reference Data Set (RDS). Here, the integrity verification unit 230 may verify the integrity thereof using an RDS stored in an RDS DB. On the other hand, when the update file is any one of a patch file and another type of file, the integrity verification unit 230 may verify the integrity thereof based on a virus check tool.

The update file generation unit 240 generates a final update file from the update files, the integrity of which has been verified. Here, the update file generation unit 240 may generate the final update file so as to be stored on a CD and provide the CD to a user. Also, the update file generation unit 240 may store the final update file in an output file management DB.

The communication unit 250 may send the result of classification of the update files to the update management apparatus 300 and receive information about whether the result of classification is approved or a reclassified file type of the update files from the update management apparatus 300.

Also, when an RDS is not acquired through crawling, the communication unit 250 may request an RDS from the update management apparatus 300 and receive an updated RDS from the update management apparatus 300.

Hereinafter, the configuration of an update management apparatus of a control system according to an embodiment of the present invention will be described in detail with reference to FIG. 3.

Figure 3:
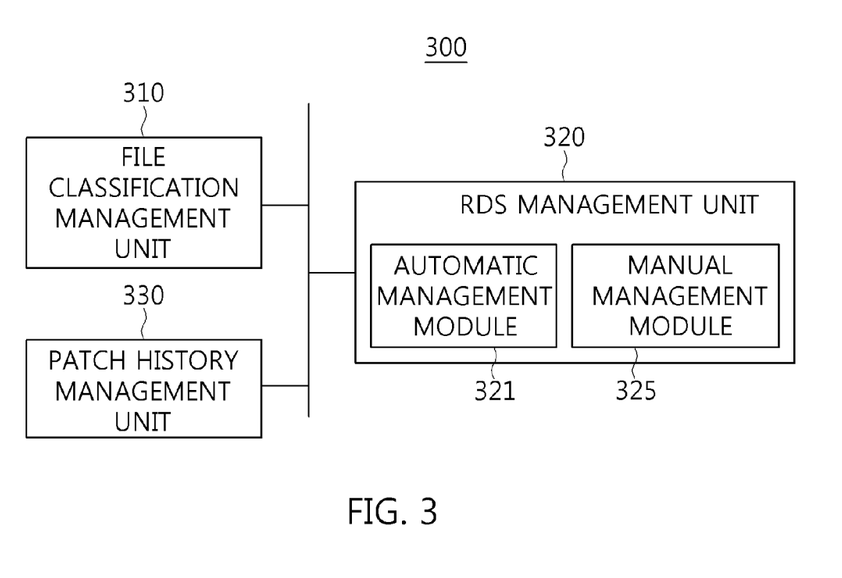
FIG. 3 is a block diagram that shows the configuration of an update management apparatus of a control system according to an embodiment of the present invention.

FIG. 3 is a block diagram that shows the configuration of an update management apparatus of a control system according to an embodiment of the present invention.

As illustrated in FIG. 3, an update management apparatus 300 of a control system includes a file classification management unit 310, an RDS management unit 320, and a patch history management unit 330. Here, the RDS management unit 320 may include an automatic management module 321 and a manual management module 325.

The file classification management unit 310 receives a result of classification of an update file from the update verification apparatus 200 and stores the result.

The file classification management unit 310 may output the received result of classification of the update file to an administrator, and may receive information about whether the result of classification is approved from the administrator. Also, the file classification management unit 310 may receive information about reclassification of the update file from the administrator, and may send the result of reclassification to the update verification apparatus 200 of the control system.

As described above, the file classification management unit 310 receives a result of reclassification of the update file from the administrator, which was first classified by and received from the update verification apparatus 200, whereby a misclassified update file may be filtered.

Also, the RDS management unit 320 collects and stores a Reference Data Set (RDS) corresponding to the update file. Here, the automatic management module 321 of the RDS management unit 320 may store the RDS corresponding to the update file, acquired by automatically crawling the official homepage of a manufacturer of a control device based on a preset policy.

The update management apparatus 300 of the control system may be connected with an external network, and may collect and store RDSs for firmware files provided by major manufacturers through the Internet.

Also, when an RDS corresponding to a firmware file, which is the update file, is not stored in an RDS DB, the manual management module 325 of the RDS management unit 320 receives input for searching for information corresponding to the firmware file from the administrator, and then updates the RDS DB so as to store the found RDS corresponding to the firmware file therein.

Particularly, the administrator searches for an unreleased RDS and an RDS for the firmware of a company, the homepage of which is not crawled, using the manual management module 325, and may store the found result in the RDS DB.

Here, the manual management module 325 compares a hash value of the update file found by a user with a hash value of firmware corresponding to the control device of the control system, and may update the RDS when the two hash values are equal to each other.

The patch history management unit 330 determines whether at least one of a program corresponding to the control device of the control system and the update file is the latest version. Then, when it is determined that at least one of the program corresponding to the control device and the update file is not the latest version, the patch history management unit 330 may output an update notification message.

Here, the patch history management unit 330 may determine whether the program corresponding to the control device and the update file are updated to the latest version using at least one of an RDS and program version information input by a user or an administrator.

Also, the patch history management unit 330 may support updating of the program or the update file by connecting to a URL corresponding to the latest version of at least one of the program and the update file.

Hereinafter, an update verification method of a control system according to an embodiment of the present invention will be described in detail with reference to FIG. 4.

Figure 4:
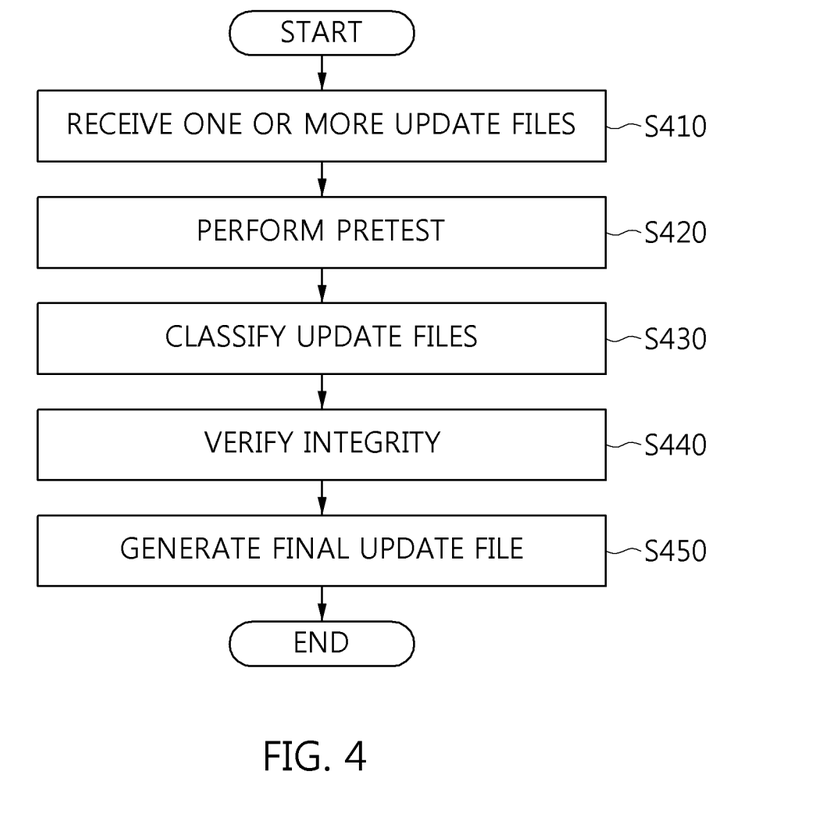
FIG. 4 is a flowchart for explaining an update verification method for a control system according to an embodiment of the present invention.

FIG. 4 is a flowchart for explaining an update verification method of a control system according to an embodiment of the present invention.

First, an update verification apparatus 200 of a control system receives one or more update files at step S410.

The update verification apparatus 200 of the control system may receive one or more update files from an external storage device, such as a USB memory device, a CD, or the like. Here, the update file is a file for updating a program installed in the control system, and may include at least one of a firmware file, a patch file and another type of file.

Here, the firmware file is firmware of various devices including a PLC, and the patch file may be a file for updating an operating system or for patching computer vaccine. Other files may be files that do not change programs installed in the control system, such as a manual for a patch file, or the like.

Also, the update verification apparatus 200 of the control system may receive login information from a user and authenticate the user, and may receive the update file only when the user is successfully authenticated.

Also, the update verification apparatus 200 of the control system performs a pretest for the update file at step S420.

The update verification apparatus 200 of the control system may perform the pretest at the time of receiving the update file from the external storage device. Here, the update verification apparatus 200 of the control system may perform the pretest that includes at least one of checking whether the update file is infected with malicious code and checking whether the update file violates a policy.

The update verification apparatus 200 of the control system may filter out an update file that has been determined to be infected with malicious code. Also, the update verification apparatus 200 of the control system may filter out an update file that has been determined to violate a preset policy.

For example, if jpg files are not allowed according to the policy of the control system, the update verification apparatus 200 of the control system filters jpg files from the input update files, thereby excluding the jpg files from final update files. That is, the update verification apparatus 200 of the control system checks whether the update file violates the policy, and may thereby exclude the update files that cannot be applied to the control system.

Subsequently, the update verification apparatus 200 of the control system classifies the one or more update files depending on the file types thereof at step S430.

The update verification apparatus 200 of the control system may classify the one or more update files that have passed the pretest at step S420 into any one file type of a firmware file, a patch file and another type of file.

Here, the update verification apparatus 200 of the control system may send the result of classification of the update files to an update management apparatus 300. Also, the update verification apparatus 200 of the control system may receive information about whether the result of classification of the update files is approved or a file type of the update file, reclassified by the update management apparatus 300, from the update management apparatus 300.

Also, the update verification apparatus 200 of the control system may store the result of classification of the update files. Here, the update verification apparatus 200 of the control system may store at least one of the ID of the user who inputs the update file, the date and time at which the update file is input, and a hash value of the update file.

As described above, the update verification apparatus 200 of the control system stores the result of classification of the update files, whereby the stored result may be used for follow-up management.

Also, the update verification apparatus 200 of the control system verifies the integrity of the update files at step S440.

The update verification apparatus 200 of the control system may verify the integrity of the update file depending on the file type thereof. When the file type is a firmware file, the update verification apparatus 200 of the control system may verify the integrity based on a Reference Data Set (RDS).

Here, the RDS is a set of hash values of files that are known to be normal files. Accordingly, when the RDS of the firmware file corresponding to the update file is included in the previously stored RDS DB, the update verification apparatus 200 of the control system determines that the integrity of the update file is verified.

The RDS DB is constructed in advance by the update management apparatus 300, and the update management apparatus 300 may collect an RDS of firmware provided by major manufacturers in advance and store it in the RDS DB. Here, the RDS DB may include at least one of a company name, a file name, a file size, version information, a date, MD5, SHA-1, SHA-256, and CRC32 corresponding to the firmware.

For the convenience of description, the update management apparatus 300 is described as constructing the RDS DB and verifying the integrity of the update file, but without limitation thereto, the update management apparatus 300 may verify the integrity of the update file using an RDS DB constructed in advance by another device.

On the other hand, when the RDS of the firmware file is not included in the RDS DB, the update verification apparatus 200 of the control system excludes the firmware file from the final update file.

Also, when the RDS of the firmware file is not included in the RDS DB, the update verification apparatus 200 of the control system may request the update management apparatus 300 to update the RDS DB. Then, the update verification apparatus 200 of the control system may verify the integrity of the update file based on the updated RDS DB.

When the file type of the update file is a patch file or another type of file, the update verification apparatus 200 of the control system may verify the integrity based on a virus check tool. Particularly, the update verification apparatus 200 of the control system may verify the integrity of a patch file or another type of file using a tool such as VirusTotal, which checks files using the maximum of 43 different virus-checking products.

Also, the update verification apparats 200 of the control system may verify the integrity of a patch file or another type of file using the hash value (MD5, SHA-1 or SHA-256) thereof.

Finally, the update verification apparatus 200 of the control system generates a final update file at step S450.

The update verification apparatus 200 of the control system generates a final update file from the one or more update files, the integrity of which has been verified. Here, the update verification apparatus 200 of the control system generates the final update file so as to be stored on a CD, and may provide the CD to a user.

That is, the update verification apparatus 200 of the control system generates the final update file so as to be burned to a CD, so that it cannot be changed, whereby only the verified update files may be used for patching.

Also, the update verification apparatus 200 of the control system stores the final update file in order to use it for checking an update history when a problem occurs.

Hereinafter, an RDS management unit of an update management apparatus according to an embodiment of the present invention will be described in detail with reference to FIG. 5.

Figure 5:
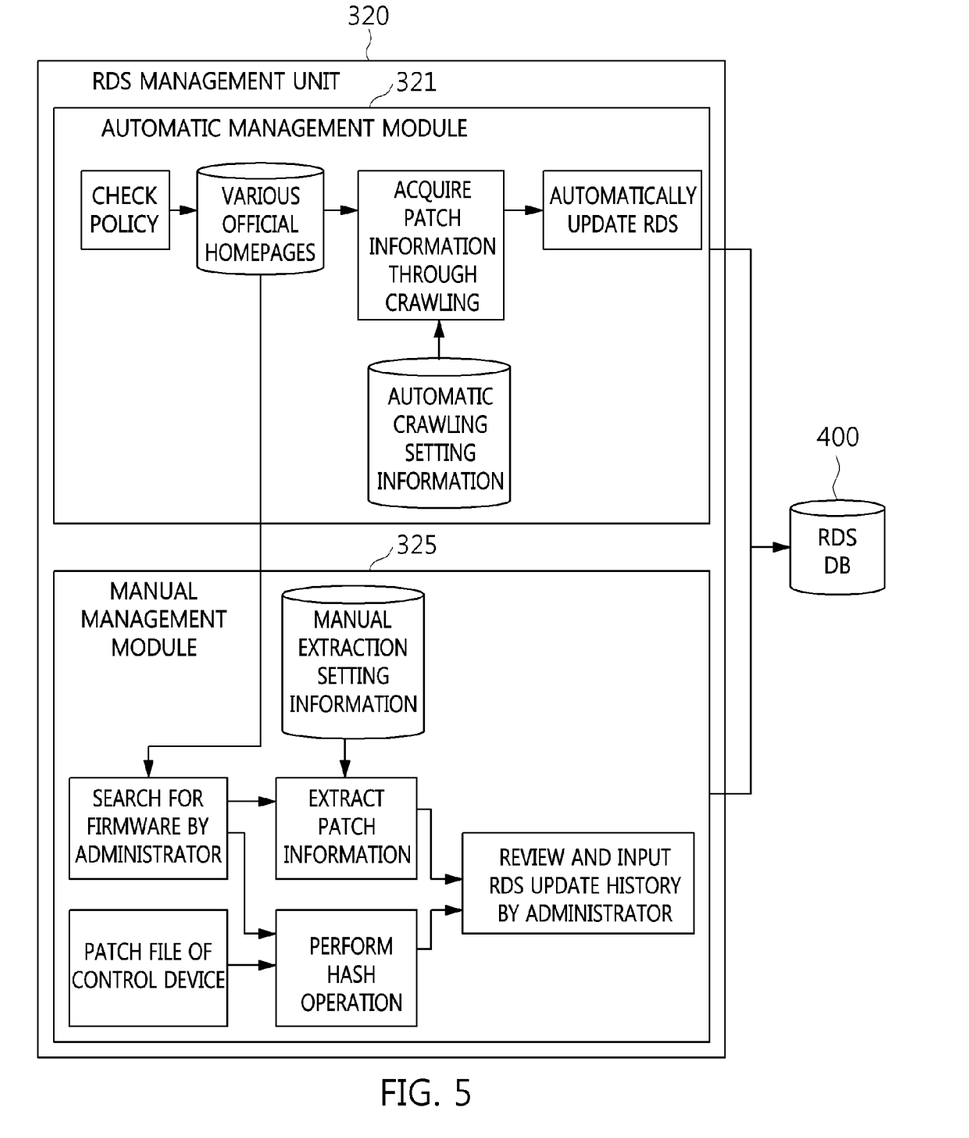
FIG. 5 is a view for explaining an RDS management unit of an update management apparatus according to an embodiment of the present invention.

FIG. 5 is a view for explaining an RDS management unit of an update management apparatus according to an embodiment of the present invention.

As illustrated in FIG. 5, the RDS management unit 320 of the update management apparatus 300 includes an automatic management module 321 and a manual management module 325.

The automatic management module 321 acquires patch information by crawling an official homepage of a control device manufacturer based on a preset policy. Here, the automatic management module 321 may acquire patch information through crawling based on automatic crawling setting information. Also, the automatic management module 321 automatically updates an RDS based on the acquired patch information, and stores the updated RDS in an RDS DB 500.

Meanwhile, an RDS that is not released in the official homepage of the control device manufacturer or an RDS for firmware of a manufacturer, the homepage of which is not crawled, may be manually searched for by an administrator and then be stored in the RDS DB 500.

When the manual management module 325 requests an administrator to search for the RDS of firmware, the administrator may search for the corresponding firmware on the Internet. Then, the manual management module 325 compares the hash value of the firmware downloaded over the Internet with that of the firmware file corresponding to the control device.

When the two hash values are equal to each other, the manual management module 325 receives an RDS update history reviewed by the administrator based on patch information of the firmware downloaded over the Internet, and stores it in the RDS DB 500. When the patch information of the downloaded firmware is extracted, the manual management module 325 may extract the patch information based on manual extraction setting information.

Hereinafter, the process of generating a final update file of an update verification apparatus according to an embodiment of the present invention will be described in detail with reference to FIG. 6.

Figure 6:
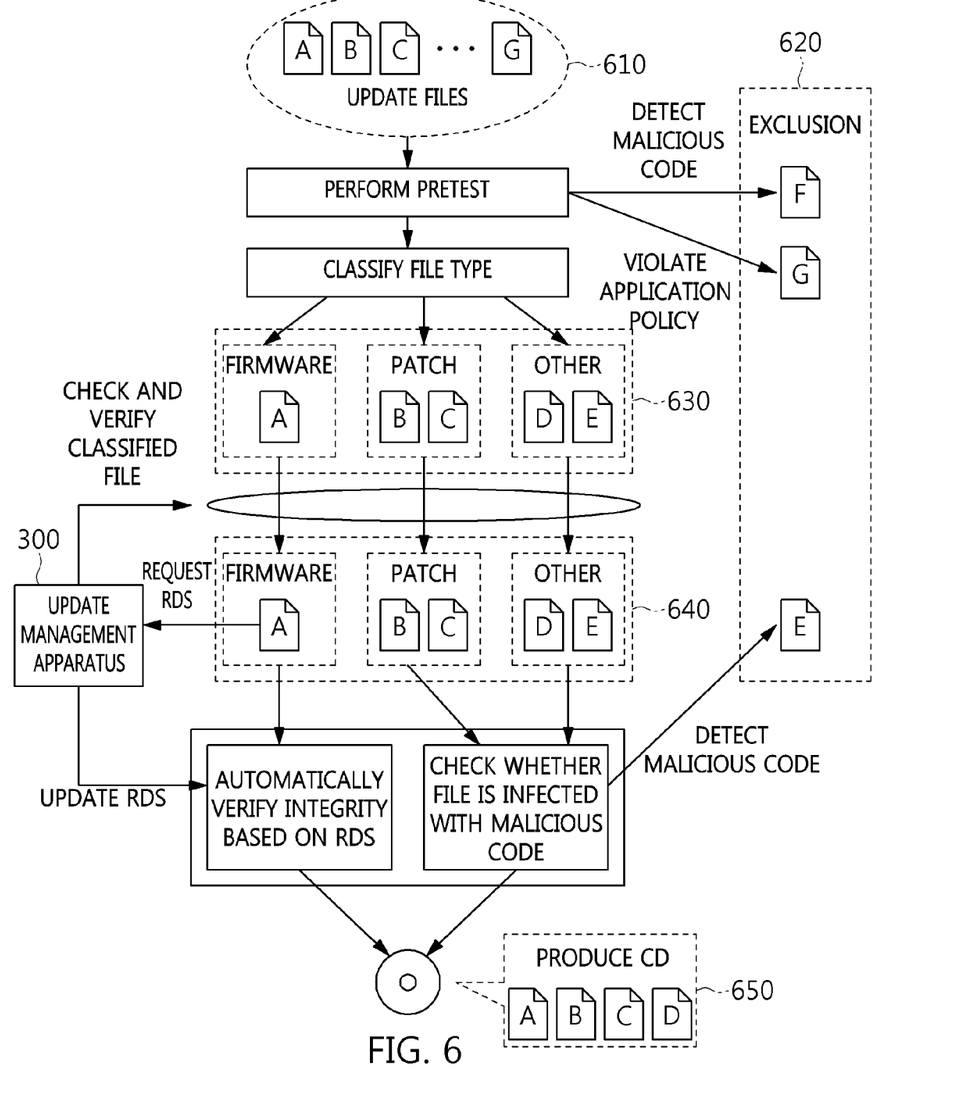
FIG. 6 is a view for explaining the process of generating a final update file according to an embodiment of the present invention.

FIG. 6 is a view for explaining the process of generating a final update file according to an embodiment of the present invention.

As illustrated in FIG. 6, the update verification apparatus 200 of the control system receives update files 610. Here, assume that the update verification apparatus 200 of the control system receives update files A, B, C, D, E, F and G from an external storage device such as a USB storage device or the like.

Here, assume that the files A, B and F are firmware files, the files C and G are patch files, and the files D and E are other files. Also, assume that the file G is a jpg file, and that the files E and F include malicious code.

The update verification apparatus 200 of the control system may exclude the file F that includes malicious code by performing a pretest. Also, the update verification apparatus 200 of the control system may exclude the file G based on a policy stating that jpg files are not allowed.

Then, the update verification apparatus 200 of the control system classifies the update files depending on the file types thereof. Here, the update verification apparatus 200 of the control system may request the update management apparatus 300 to check and verify the classified files by sending the result of classification thereto. Also, the update verification apparatus 200 of the control system may receive information about reclassification of the update files from the update management apparatus 300.

For example, when the update verification apparatus 200 of the control system classifies the file A as a firmware file, classifies the files B and C as patch files, and classifies the files D and E as other files, the update management apparatus 300 receives information about reclassification of the update files from a user, and may then reclassify the files A and B as firmware files, reclassify the file C as a patch file, and reclassify the files D and E as other files.

Then, the update verification apparatus 200 of the control system verifies the integrity of the files A, B, C, D and E. Here, the update verification apparatus 200 of the control system may verify the integrity of the files A and B, which are firmware files, based on an RDS therefor, and may verify the integrity of files C, D and E, which are patch files or other files, using a virus check tool.

Also, the update verification apparatus 200 of the control system may exclude the file E, in which malicious code is detected, from the update files as a result of verifying the integrity thereof using the virus check tool.

Also, the update verification apparatus 200 of the control system may verify the integrity of the firmware file based on the RDS stored in the RDS DB, and may request the RDS from the update management apparatus 300 and verify the integrity of the firmware file using the updated RDS.

For example, when the RDS for the file B is automatically acquired through crawling but the RDS for the file A is not acquired through crawling, the update verification apparatus 200 of the control system may request the update management apparatus 300 to update the RDS. Then, the update management device 300 receives the RDS for file A, found by an administrator, thereby updating the RDS.

Also, the update verification apparatus 200 of the control system may generate a final update file 650 that includes files A, B, C and D, the integrity of which has been verified. Here, the update verification apparatus 200 of the control system may generate and provide the final update file 650 in the state of being stored on a CD, and may store the final update file or send it to the update management apparatus 300.

As described above, the update verification apparatus 200 of the control system may generate the final update file 650 by excluding files F, G and E 620, which are files in which malicious code is detected or which violate an application policy, from the seven input update files.

The update verification apparatus 200 of the control system may generate the final update file 650 so as to be burned to a CD and provide the CD to a user, and the user may patch or update the control system only through the provided CD.

Hereinafter, another embodiment of an update management system of a control system according to an embodiment of the present invention will be described in detail with reference to FIG. 7.

Figure 7:
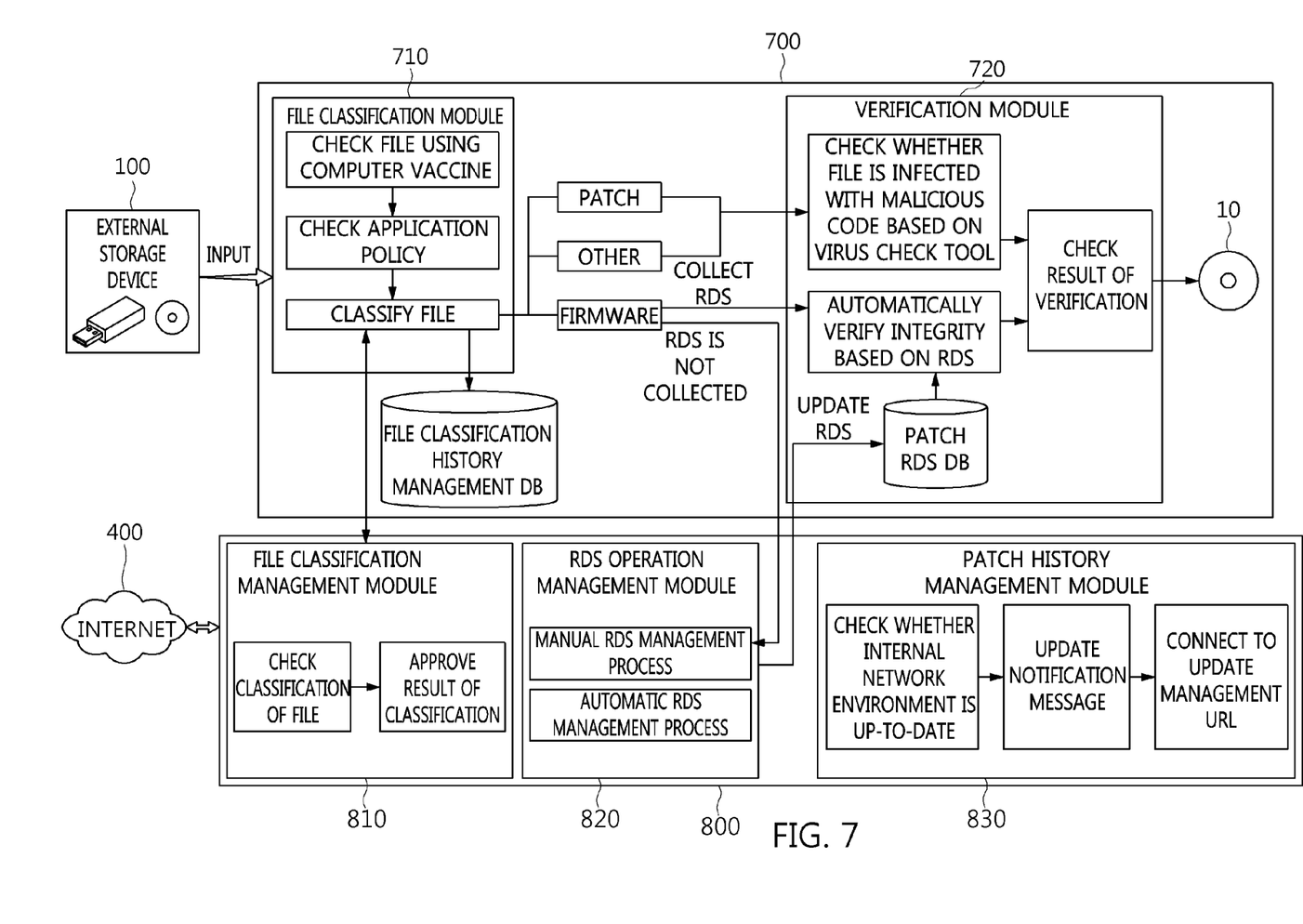
FIG. 7 is a view that shows an update management system of a control system according to an embodiment of the present invention.

FIG. 7 is a view that shows an update management system of a control system according to an embodiment of the present invention.

As illustrated in FIG. 7, an update verification apparatus 700 receives update files from an external storage device 100. Then, the file classification module 710 of the update verification apparatus 700 tests the update files for viruses using computer vaccine, and checks an application policy, thereby performing a pretest for the update files. Then, the file classification module 710 classifies the update files depending on the file types thereof.

Here, the file classification module 710 may store the result of classification of the update files in a file classification history management DB, and may send the result of classification of the update files to an update management apparatus 800.

Also, the verification module 720 of the update verification apparatus 700 verifies the integrity of the update files. The verification module 720 may verify the integrity of a firmware file by performing automatic integrity verification based on an RDS, and may verify the integrity thereof using a patch RDS DB. Also, the verification module 720 may verify the integrity of a patch file or another type of file by checking whether the file is infected with malicious code using a virus check tool.

The verification module 720 generates a final update file 10 from the update files, the integrity of which has been verified, and generates the final update file 10 so as to be stored on a CD and provide the CD to a user.

Meanwhile, the update management apparatus 800 is connected with the Internet 400, which is an external network, and includes a file classification management module 810, an RDS operation management module 820, and a patch history management module 830.

The file classification management module 810 provides an administrator with the result of classification of the update files, which is received from the update verification apparatus 700, and receives the administrator's approval for the result of classification of the update files. Then, the file classification management module 810 may send information about whether the result of classification is approved to the update verification apparatus 700.

The RDS operation management module 820 collects and stores an RDS based on a manual RDS management process and an automatic RDS management process. Here, the RDS operation management module 820 may store the RDS in the patch RDS DB of the update verification apparatus 700.

Also, the patch history management module 830 checks whether an internal network environment is up to date, and may output an update notification message to an administrator when it is determined that there is an update available therefor. Then, the patch history management module 830 provides an administrator with an update management URL, thereby helping the administrator in updating a program of the internal network.

The file classification module 710 illustrated in FIG. 7 may be practically implemented in the same manner as the pretest performance unit 210 and the file type classification unit 220 in FIG. 2. Also, the verification module 720 may be practically implemented in the same manner as the integrity verification unit 230 and the update file generation unit 240 in FIG. 2.

Also, the file classification management module 810 in FIG. 7 may be practically implemented in the same manner as the file classification management unit 310 in FIG. 3, the RDS operation management module 820 may be practically implemented in the same manner as the RDS management unit 320 in FIG. 3, and the patch history management module 830 may be practically implemented in the same manner as the patch history management unit 330 in FIG. 3.

Figure 8:
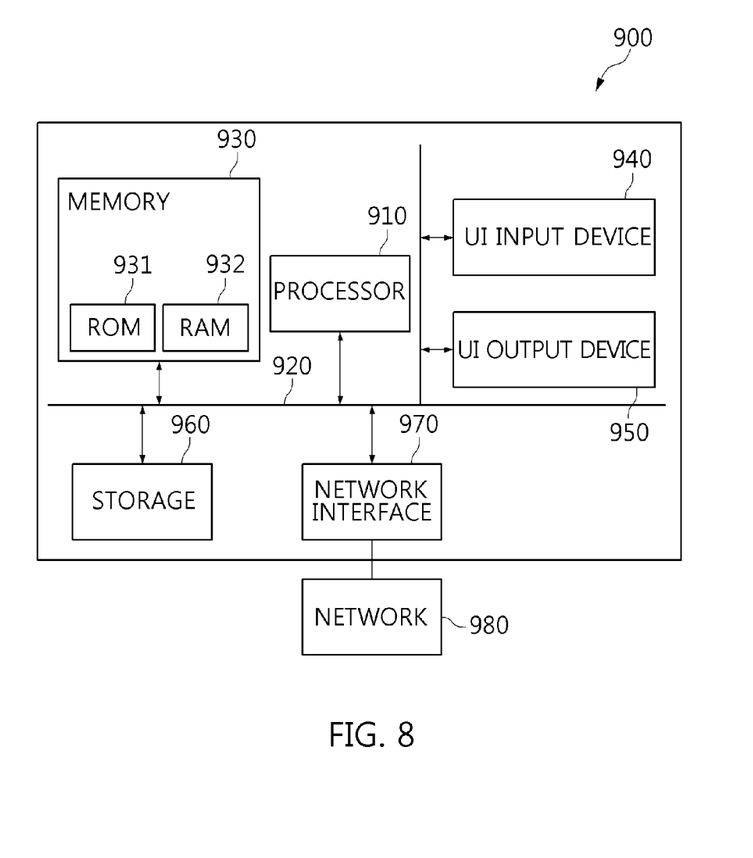
FIG. 8 is a block diagram that shows a computer system according to an embodiment of the present invention.

FIG. 8 is a block diagram that shows a computer system according to an embodiment of the present invention.

Referring to FIG. 8, an embodiment of the present invention may be implemented in a computer system 900, such as a computer-readable recording medium. As illustrated in FIG. 8, the computer system 900 may include one or more processors 910, memory 930, a user interface input device 940, a user interface output device 950, and storage 960, which communicate with each other via a bus 920. Also, the computer system 900 may further include a network interface 970 connected with a network 980. The processor 910 may be a central processing unit or a semiconductor device for executing processing instructions stored in the memory 930 or the storage 960. The memory 930 and the storage 960 may be various types of volatile or nonvolatile storage media. For example, the memory may include ROM 931 or RAM 932.

Therefore, an embodiment of the present invention may be implemented as a temporary computer-readable medium in which a method implemented through a computer is recorded or in which instructions executable by a computer are recorded. When the computer-readable instructions are executed by a processor, the computer-readable instructions may perform a method according to at least one aspect of the present invention.

According to the present invention, files related to patching and updating of a control system are checked in advance, whereby the occurrence of a security problem may be prevented.

Also, according to the present invention, a final update file is generated using an update verification apparatus that is separate from a control system, whereby an input update file may be prevented from affecting the control system when the input update file is infected with malicious code.

Also, according to the present invention, it is possible to respond to a problem related to patching and updating based on a history of patching and updating of a control system.

Also, according to the present invention, an update of a program installed in a control system may be announced automatically, and information about the update may be provided.

Also, according to the present invention, a Reference Data Set (RDS) is automatically or manually collected and managed, whereby a final update file may be generated using a firmware file, the integrity of which has been verified.

As described above, the apparatus for managing an update of a control system and the apparatus and method for verifying an update of the control system according to the present invention are not limitedly applied to the configurations and operations of the above-described embodiments, but all or some of the embodiments may be selectively combined and configured, so that the embodiments may be modified in various ways.

What is claimed is:

1. An apparatus for verifying an update of a control system comprising:
    one or more processors;
    a memory comprising a plurality of units which are executable by the one or more processors, the plurality of units comprising:
    a pretest performance unit for performing a pretest for a plurality of input update files that input in order to update a program corresponding to a control device of the control system;
    a file type classification unit for classifying the plurality of update files excluding files based on the pretest results from the plurality of input update files into any one file type of a firmware file, a patch file, and another type of file;
    an integrity verification unit for verifying integrity of the plurality of update files so as to correspond to the file types of the plurality of update files;
    an update file generation unit for generating a final update file from the plurality of update files, the integrity of which has been verified; and
    a communication unit for sending a result of classifying the plurality of update files to an update management apparatus and receiving information about whether the result of classifying the plurality of update files is approved or the file type of the update file, set by the update management apparatus, from the update management apparatus;
    wherein the pretest performance unit performs the pretest that includes checking whether each input update file violates an application policy unrelated to whether the update file contains malware and excludes all files that violate the application policy from the plurality of input update files,
    wherein the integrity verification unit verifies the integrity based on a Reference Data Set (RDS) comprised of hash values when the update file is the firmware file by comparing the RDS of the update file against the RDS of known firmware provided by the manufacturer of the firmware,
    wherein the integrity verification unit verifies the integrity based on a virus check tool when the update file is any one of the patch file and the other type of file, wherein the virus tool uses a plurality of different virus-checking products on the patch file or the other type of file.

2. The apparatus of claim 1, wherein the update file generation unit generates the final update file so as to be stored on a CD and provides the CD to a user.

3. The apparatus of claim 1, wherein the integrity verification unit verifies the integrity using the RDS, received from an update management apparatus in response to a request sent thereto.

4. A method for verifying an update of a control system, performed by an apparatus for verifying an update of the control system, comprising:
    performing a pretest for the plurality of input update files that are input in order to update a program corresponding to a control device of the control system;
    classifying a plurality of update files excluding files based on the pretest results from the plurality of input update files into any one file type of a firmware file, a patch file, and another type of file;
    verifying integrity of the plurality of classified update files;
    generating a final update file from the plurality of update files, the integrity of which has been verified;
    sending a result of classifying the plurality of update files to an update management apparatus; and
    receiving information about whether the result of classifying the plurality of update files is approved or the file type of the update file, set by the update management apparatus, from the update management apparatus;

wherein the pretest performance unit performs the pretest that includes checking whether each input update file violates an application policy unrelated to whether the update file contains malware and excludes all files that violate the application policy from the plurality of input update files, wherein the integrity verification unit verifies the integrity based on a Reference Data Set (RDS) comprised of hash values when the update file is the firmware file by comparing the RDS of the update file against the RDS of known firmware provided by the manufacturer of the firmware, wherein the integrity verification unit verifies the integrity based on a virus check tool when the update file is any one of the patch file and the other type of file, wherein the virus tool uses a plurality of different virus-checking products on the patch file or the other type of file.

5. The method of claim 4, wherein generating the final update file is configured to generate the final update file so as to be stored on a CD and to provide the CD to a user.

6. The method of claim 4, wherein verifying the integrity comprises:

requesting the RDS from an update management apparatus;

receiving the RDS from the update management apparatus; and verifying the integrity using the received RDS.

* * * * *